US008085715B2

(12) United States Patent
Law et al.

(10) Patent No.: US 8,085,715 B2
(45) Date of Patent: Dec. 27, 2011

(54) CONTROLLING THE USE OF ACCESS POINTS IN A TELECOMMUNICATIONS NETWORKS

(75) Inventors: Alan Law, Newbury (GB); Paul Edwards, Newbury (GB); Peter Howard, Newbury (GB); Jonathon Batkin, Wiltshire (GB); Jose Luis Carrizo Martinez, Newbury (GB)

(73) Assignee: Vodafone Group, PLC, Newbury, Berkshire (GB)

( * ) Notice: Subject to any disclaimer, the term of this patent is extended or adjusted under 35 U.S.C. 154(b) by 0 days.

(21) Appl. No.: 12/311,414

(22) PCT Filed: Oct. 19, 2007

(86) PCT No.: PCT/GB2007/004007
§ 371 (c)(1),
(2), (4) Date: May 3, 2010

(87) PCT Pub. No.: WO2008/047140
PCT Pub. Date: Apr. 24, 2008

(65) Prior Publication Data
US 2010/0214956 A1 Aug. 26, 2010

(30) Foreign Application Priority Data

Oct. 19, 2006 (GB) .................................. 0620847.4
Jun. 29, 2007 (GB) .................................. 0712622.0
Aug. 14, 2007 (GB) .................................. 0715794.4
Sep. 28, 2007 (GB) .................................. 0718936.8

(51) Int. Cl.
*H04W 4/00* (2009.01)
(52) U.S. Cl. .......................................................... 370/328
(58) Field of Classification Search .......... 370/328–339; 455/403, 410, 422.1, 426.1, 426.2, 436, 439, 455/444
See application file for complete search history.

(56) References Cited

U.S. PATENT DOCUMENTS

| 6,925,074 | B1 * | 8/2005 | Vikberg et al. | 370/338 |
| 7,272,397 | B2 * | 9/2007 | Gallagher et al. | 455/436 |
| 2007/0184824 | A1 * | 8/2007 | Nylander et al. | 455/422.1 |
| 2008/0254833 | A1 * | 10/2008 | Keevill et al. | 455/558 |

FOREIGN PATENT DOCUMENTS

| WO | WO2004/110026 A1 | 12/2004 |
| WO | WO2006/106261 A2 | 10/2006 |

OTHER PUBLICATIONS

3GPP TS 23.236 V6.3.0 (Mar. 2006), Technical Specification, 3rd Generation Partnership Project; Technical Specification Group Services and System Aspects; Intra-domain connection of Radio Access Network (RAN) nodes to multiple Core Network (CN) nodes (Release 6), 37 pp.

* cited by examiner

*Primary Examiner* — Frank Duong
(74) *Attorney, Agent, or Firm* — Muirhead and Saturnelli, LLC

(57) ABSTRACT

A mobile telecommunications network includes a radio access network comprising base stations and one or more additional access points. An access point is connected to a network core by an IP transport broadband connection. The access point is configured to appear to the mobile terminal as a conventional base station—that is, for example, it communicates with the mobile terminal using GSM or UMTS transport protocols and does not require any modification to a standard GSM or UMTS mobile terminal. Access Points may not be under the direct control of the network provider, and so are more susceptible to security threats. The described system allows the network provider to verify that the access point through which a mobile terminal is about to communicate is a legitimate and trusted base station and/or is at a particular location. Differential charging may be performed in dependence upon a subscriber's location.

23 Claims, 4 Drawing Sheets

CONTROLLING THE USE OF ACCESS POINTS IN A TELECOMMUNICATIONS NETWORKS

TECHNICAL FIELD

This application relates to a telecommunications network including a radio access network for wirelessly transmitting between a mobile telecommunications device and a base station. This application also relates to a method and arrangement for controlling communication access of a mobile device to one or more base stations.

BACKGROUND TO THE INVENTION

Conventional access to the features and services provided by GSM and UMTS networks involves signalling between the mobile terminal and a standard base station (macro base station) that has a dedicated connection to an MSC and provides coverage in the cell occupied by the mobile terminal using cellular telecommunication (e.g. GSM or UMTS) transport protocols. There have recently been proposals to allow access to the features and services provided by GSM and UMTS networks by providing additional special base stations (femto base stations), referred to as access points (APs), for example at a subscriber's home, in order to increase network capacity. These access points communicate with the core network via IP based communications, such as a broadband IP network, and are typically routed via the Internet.

Many different names have been given to APs, such as home access points (HAPs), micro-base stations, pico-base stations, pico-cells and femto-cells, but all names refer to the same apparatus. APs provide short range, localized coverage, and are typically purchased by a subscriber to be installed in their house or business premises.

It has also been proposed to use APs in the Long Term Evolution (LTE) telecommunications network currently being developed, but not yet implemented. LTE is likely to be the next network implementation after 3G.

An advantage of introducing APs in existing telecommunications networks is that, where sufficient numbers of APs are implemented, the power level of the macro coverage could be reduced, due to a lower demand for the macro-base stations. Power reductions of course result in financial savings.

A further advantage of using an access point connected to the core network via an IP network is that existing broadband Digital Subscriber Line (DSL) connections can be used to link mobile terminals with the network core without using the capacity of the radio access network or transmission network of a mobile telecommunications network. In other words, the AP is integrated into a DSL modem/router and uses DSL to backhaul the traffic to the communication network.

A still further advantage is that APs are able to provide mobile network access to areas where there is no radio access network coverage. Thus, they are expected to be particularly beneficial when installed in buildings with poor radio network coverage from the macro network but which have DSL connections. Additionally, an AP could provide UMTS coverage where there is no 3G coverage at all, perhaps only GSM coverage.

However, since these access points are not conventional base stations, additional challenges arise. In particular, since the access points are typically deployed in environments not directly under the control of the network provider, it is desirable that the security of these access points can be guaranteed for each subscriber making use of them.

Currently, telecommunication network providers sometimes offer subscribers different call tariffs based on their location. For instance, one such service provides subscribers with cheaper tariffs when they use their mobile terminal in their home.

With reference to FIG. 3, in one known implementation of such a system, upon a subscriber subscribing to a reduced tariff service, the core network 140 identifies which base stations, and hence which cells, provide coverage to the subscriber's home. These base stations are referred to as the subscriber's home base stations. Each base station has a unique cell ID and the unique cell IDs of these home base stations are logged against the subscriber's profile. In the example of FIG. 3 the base stations with cell IDs 1245 and 1234 provide coverage over the subscriber's home and are therefore recorded alongside the subscriber's profile in the network database 160. Base station with cell ID 1256 is not recorded as a home base station as it does not provide coverage over the subscriber's home.

Therefore, when the subscriber is communicating on the mobile network and is located within his home, the subscriber's communication traffic will be routed from either of the home base stations having cell ID 1245 or 1234, through the Controller (e.g. a Radio Network Controller (RNC) in 3G) 130 and onward to the core network 140, which includes MSC 135.

During the call set up procedure, the core network will receive the MSISDN of the subscriber and the cell ID of the base station with which the subscriber is communicating. In order to confirm at which rate to change the subscriber, the core network 140 checks whether the subscriber is using one of the home base stations which cover his house 10. This check is made by consulting the Location Based Charging (LBC) Module 150 and database 160 and by comparing the MSISDN and cell ID identified in the call with those stored in the database. If the cell ID for the MSISDN is the ID of one of the subscriber's logged home base stations, the subscriber is recognised as calling from within his home and is charged at a reduced rate, otherwise he is charged at his standard rate. In the example of FIG. 3, the reduced rate will be applied when the subscriber's call is routed through base stations 1245 and 1234 but not when the call is routed through base station 1256.

With this in mind, APs provide another opportunity for network providers to offer reduced rates to subscribers. For instance, subscribers may benefit from a different call tariff when using their mobile terminal through an AP acting as a base station.

Further additional challenges arise in implementing these access points as conventional base stations, in view of their potential mobility. Ideally APs are introduced into a telecommunications network and remain fixed at that site. However, there is the possibility that subscribers may decide to relocate their access point for use at a different site. This would be problematic where the subscriber obtains a reduced tariff for using their AP as a base station from their home, as potentially they would be able to also receive the reduced tariff at other locations by relocating the AP. There is therefore the need for determining the location of an AP in order to determine whether or not a reduced tariff is to be used.

A further problem in regard to the mobility of APs is that mobile telecommunication providers are allocated spectrum in specific regions, so it is vital that they are able to identify the location of all their base stations, which includes APs, since APs are functionally equivalent to macro base stations. In fact, proposed regulatory regulations are likely to require telecommunications providers to know the location of all access points in their network. There is therefore also a need to determine the location of an AP before allowing a communication to proceed or before an AP is activated.

SUMMARY OF THE INVENTION

According to the system described herein, a method of confirming the validity of an IP connected base station for a user's mobile device to communicate through includes: receiving an initiation signal from the mobile device, via the base station; identifying the base station forwarding the initiation signal; determining whether the identified base station is a valid base station; and transmitting an appropriate response signal to the mobile device.

In an embodiment, the determination step may occur only when the base station is identified as an Access Point.

In this regard, since Access Points are not under the direct control of the network provider, they are open to security threats, such as illicit eavesdropping of user data. This aspect of the invention, therefore allows the network provider to verify that the access point a mobile terminal is about to commence communicating through is a legitimate and trusted base station. By confirming the legitimacy of the base station to the mobile terminal before communication commences, and accordingly before sensitive information is transmitted to the network provider via the base station, enhanced network security can be achieved.

The process of determining the validity of the base station may confirm the geographic location of the base station.

The method may comprise identifying the base station by determining a base station identifier allocated to the base station. The method may further include identifying the base station by determining a routing identifier of the base station. The base station identifier may comprise a MAC address of the base station or other unique or generally unique identifier of the base station. The routing identifier may comprise an IP address of the base station and/or a DSL ID of the base station.

As an alternative to using the routing identifier, or in addition to using the routing identifier, the telephone number of the base station may be determined, for example by CLI.

BRIEF DESCRIPTION OF THE DRAWINGS

Embodiments of the system described herein will now be explained, by way of example, with reference to the accompanying drawings, in which.

In the drawings like elements are generally designated with the same reference sign.

DETAILED DESCRIPTION OF VARIOUS EMBODIMENTS

Figure 1:
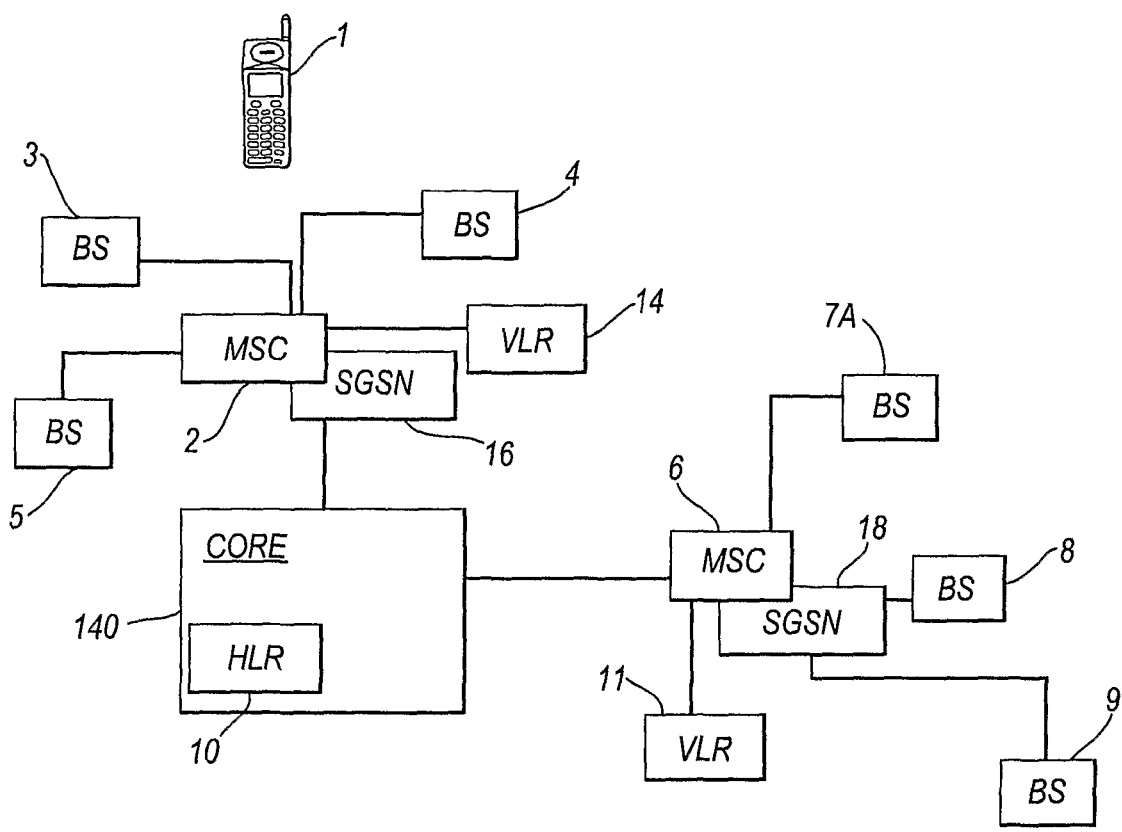
FIG. 1 is a diagrammatic drawing of certain elements of a mobile telecommunications network.

Certain elements of a mobile telecommunications network, and its operation, will now briefly be described with reference to FIG. 1.

Each base station (BS) corresponds to a respective cell of its cellular or mobile telecommunications network and receives calls from and transmits calls to a mobile terminal in that cell by wireless radio communication in one or both of the circuit switched or packet switched domains. Such a subscriber's mobile terminal is shown at 1. The mobile terminal may be a handheld mobile telephone, a personal digital assistance (PDA) or a laptop computer equipped with a datacard.

In a GSM mobile telecommunications network, each base station comprises a base transceiver station (BTS) and a base station controller (BSC). A BSC may control more than one BTS. The BTSs and BSCs comprise the radio access network.

In a UMTS mobile telecommunications network, each base station comprises a node B and a radio network controller (RNC). An RNC may control more than one node B. The node B's and RNC's comprise the radio access network.

In the proposed LTE mobile telecommunications network, each base station comprises an eNode B. The base stations are arranged in groups, and each group of base stations is controlled by a Mobility Management Entity (MME) and a User Plane Entity (UPE).

Conventionally, the base stations are arranged in groups and each group of base stations is controlled by one mobile switching centre (MSC), such as MSC 2 for base stations 3, 4 and 5. As shown in FIG. 1, the network has another MSC 6, which is controlling a further three base stations 7A, 8 and 9. In practice, the network will incorporate many more MSCs and base stations than shown in FIG. 1. The base stations 3, 4, 5, 7A, 8 and 9 each have dedicated (not shared) connection to their MSC2 or MSC6—typically a cable connection. This prevents transmission speeds being reduced due to congestion caused by other traffic.

The MSCs 2 and 6 support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 2 and 6. The SGSNs 16, 18 are equipped with an equivalent to the VLRs 11, 14 used in the packet switched domain.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) that is not visible on the card and is not known to the subscriber. The subscriber is issued with a publicly known number, that is, the subscriber's telephone number, by means of which callers initiate calls to the subscriber. This number is the MSISDN.

The network includes a home location register (HLR) 10 which, for each subscriber to the network, stores the IMSI and the corresponding MSISDN together with other subscriber data, such as the current or last known MSC or SGSN of the subscriber's mobile terminal.

When mobile terminal 1 is activated, it registers itself in the network by transmitting the IMSI (read from its associated SIM card) to the base station 3 associated with the particular cell in which the terminal 1 is located. In a traditional network, the base station 3 then transmits this IMSI to the MSC 2 with which the base station 3 is registered. In a network using the functionality described in 3GPP TS 23.236, the base station follows prescribed rules to select which MSC to use, and then transmits this IMSI to the selected MSC.

MSC 2 now accesses the appropriate storage location in the HLR 10 present in the core network 140 and extracts the corresponding subscriber MSISDN and other subscriber data from the appropriate storage location, and stores it temporarily in a storage location in a visitor location register (VLR) 14. In this way, therefore the particular subscriber is effectively registered with a particular MSC (MSC 2), and the subscriber's information is temporarily stored in the VLR (VLR 14) associated with that MSC.

Each of the MSCs of the network (MSC 2 and MSC 6) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a call, they enter the telephone number of the called party in the usual manner. This information is received by the base station 3 and passed on to MSC 2. MSC 2 routes the call towards the called party. By means of the information held in the VLR 14, MSC 2 can associate the call with a particular subscriber and thus record information for charging purposes.

The functionality just described may also apply to the proposed LTE mobile telecommunications network, with its eNode Bs performing the functionality of the base stations and the MME/UPE performing the functionality of the MSCs/VLRs. It is also to be appreciated that the functionality just described is one example of a network in which the embodiments of the invention may be implemented.

Figure 2:
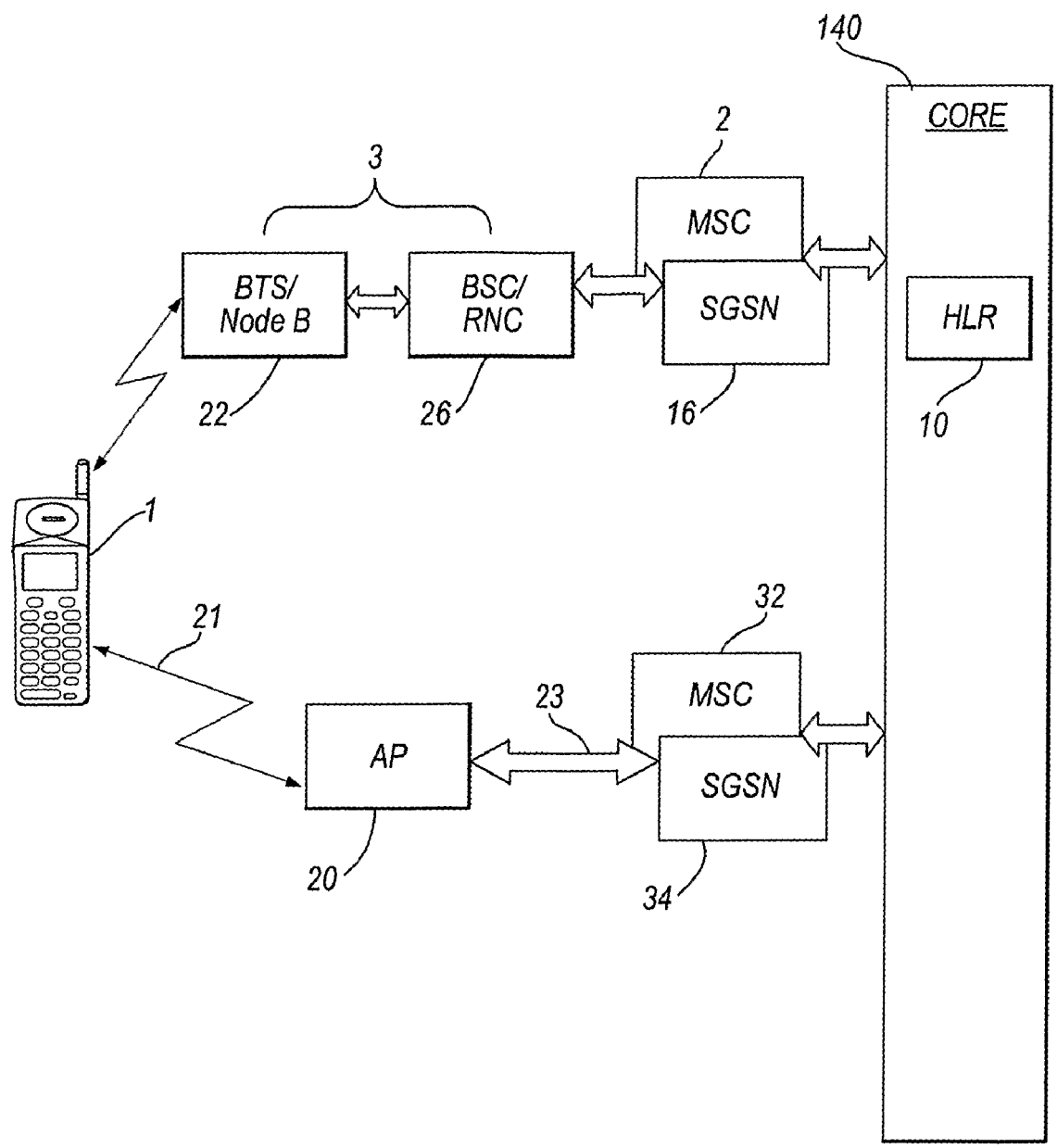
FIG. 2 shows a modified mobile telecommunications network for receiving IP based communications from an access point in addition to communications from a conventional base station.
Figure 3:
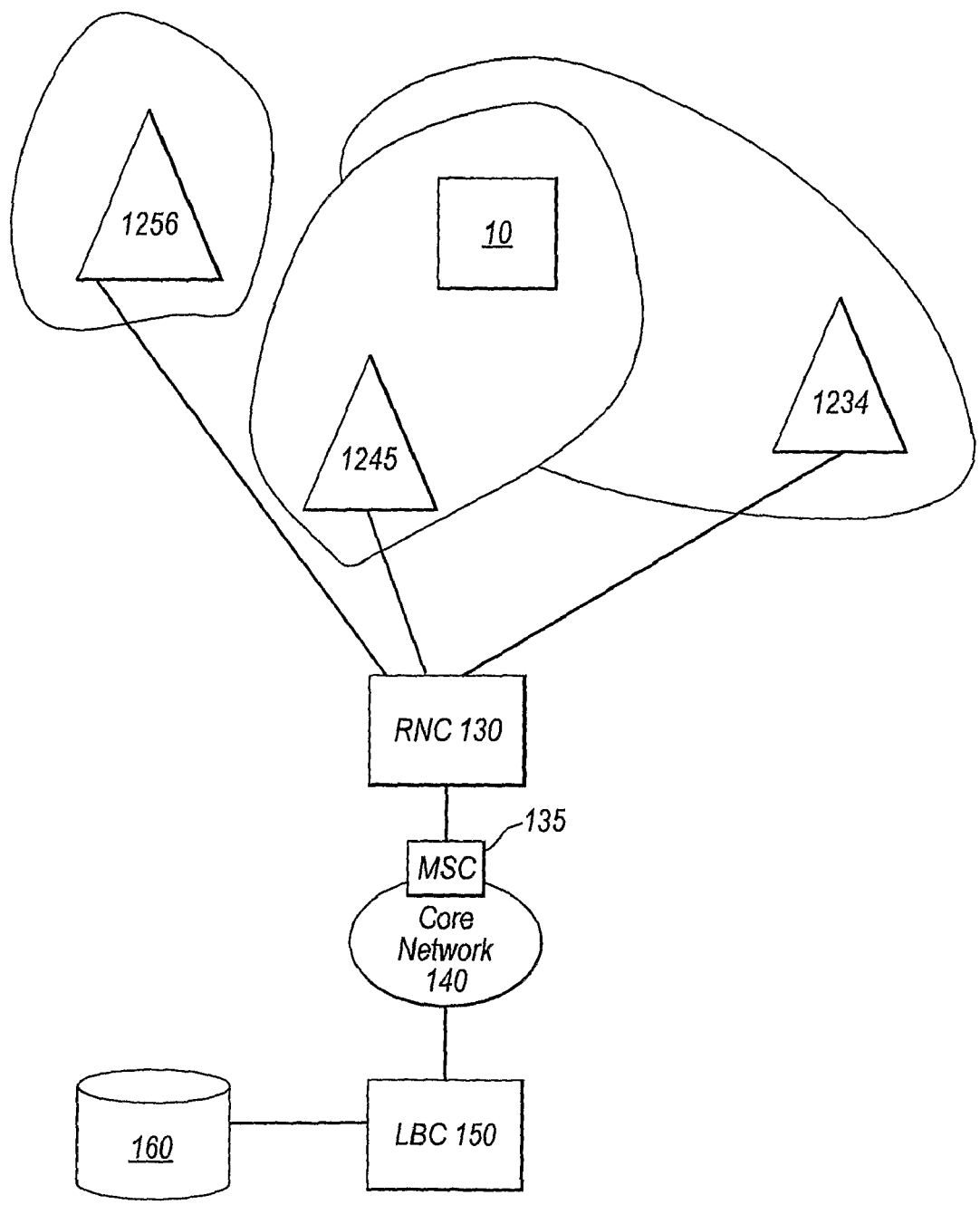
FIG. 3 shows a diagrammatic drawing of certain elements of a mobile telecommunications network for use in explaining a known approach of reducing tariffs for subscribers using mobile terminals when at home.

FIG. 2 shows elements for providing access to a GSM or UMTS network by both a conventional base station 3 and an access point (AP 20). The AP 20 communicates with the mobile terminal 1 via a radio link 21.

In the embodiments, the radio link 21 between the AP 20 and the mobile terminal 1 uses the same cellular telecommunication transport protocols as the conventional base station 3 but with a smaller range—for example 25 meters. The AP 20 appears to the mobile terminal 1 as a conventional base station, and no modification to the mobile terminal 1 is required to operate with the AP 20. The AP 20 performs a role corresponding to that of a GSM BTS 22 and BSC 26 and/or UMTS Node B and RNC and/or an LTE eNode B.

Communications 23 between the access point 20 and the core network 140 are IP based communications, and may be, for example, transmitted over a broadband IP network (and routed via the Internet). The communications are routed via MSC 32 or SGSN 34. The access point 20 converts the cellular telecommunications transport protocols used for signaling in conventional GSM or UMTS networks used between the mobile terminal 1 and the AP 20 to IP based signalling.

The connection 23 between the access point 20 and the core network 140 may use the PSTN telephone network. Typically a DSL cable connection connects the access point 20 to the PSTN network. The data is transmitted between the access point 20 and the core network 140 by IP transport/DSL transport (a backhaul connection).

The access point 20 may be connected to the core network 12 by means other than a DSL cable and the PSTN network. For example, the access point 20 may be connected to the core network 140 by a dedicated cable connection that is independent of the PSTN, or by a satellite connection between the access point 20 and the network core 140.

Using an access point 20 connected to the core network via an IP network does have advantages. Existing broadband DSL connections can be used to link mobile terminals with the network core 140 without using the capacity of the mobile telecommunications network radio access network, or where there is no conventional radio access network coverage. For example, UMTS coverage could be provided by an access point 20 where there is no conventional UMTS coverage (perhaps only GSM coverage).

AP 20 would typically be configured to serve a WLAN located in a home or office, in addition to GSM/UMTS/LTE networks. The WLAN could belong to the subscriber of the mobile terminal 1, or be an independently operated WLAN. The owner of AP 20 can program the AP so that it is either open or closed, whereby an open AP is able to carry communications from any mobile device in the GSM/UMTS network, and a closed AP is only able to carry communications from specific pre-designated mobile devices.

In embodiments of the invention, communications through a closed AP may be controlled either by the AP itself or by the network. Typically, on registering an AP the owner is able to specify those subscribers who are permitted to communicate through the AP. These subscribers may be identified by their IMSIs or MSISDNs and are logged in a register.

In some embodiments the register is stored on the AP. On attempting to communicate through the AP, the subscriber transmits his IMSI (or MSISDN) as part of the call set up procedure. The AP then compares the IMSI against the register. If the IMSI appears on the register, communication is permitted and routed on to the network. In the case that the IMSI does not appear on the register, communication is not permitted. In this case, the subscriber may be notified by a signal from the AP or the AP may signal to the subscriber to look for a different AP or macro base station.

In further embodiments the register is stored on the network along with an identification of the access point. The AP may be identified by an access point identifier (AP ID). When a communication is signalled to an AP, the AP forwards the IMSI along with its AP ID to the network. The network then compares the IMSI with the IMSIs that are registered to that AP. The network would only allow the call to be directed through the AP if IMSI (or MSISDN) is registered against that AP. If the subscriber is not registered with that AP, the call could either be terminated or directed onto the macro network.

Of course, if an AP is designated as an open AP, no selection of IMSI is necessary and communications from any IMSI can be directed through the AP. Such open APs would not require an allowed IMSI register.

Since APs are not directly controlled by the network provider, there are security issues relating to them. For instance, it is possible that an AP be hacked and a bogus AP could be used to replace a legitimate AP, in order to access sensitive information passing between mobile terminals using the access point and the core network. For instance, a bogus AP could send IMSI requests to idle GSM/UMTS mobile devices located in the vicinity of the AP. The bogus AP would then be able to obtain IMSI information, and use that IMSI information in a service request towards the core network. Information received by initiating this service request could then be used to make illegal use of a subscriber's account. It is therefore imperative that APs provide an acceptable level of security to the user, or the user may become dissatisfied with the network.

From the network's point of view, it is also imperative that subscribers do not communicate via bogus APs, as such access to an AP may be then be used to gain unauthorised access to core network elements, such as via unprotected O&M interfaces. This unauthorised access could then be used to flood the core network in order to maliciously cause denial of service, to steal customer data or to commit fraud by manipulating billing data, for instance.

Therefore, according to a first embodiment of the invention, the network provides a mechanism for validating the identity of an AP before a mobile terminal begins transmitting sensitive information to the network via the AP.

In this regard, when a subscriber wishes to activate mobile terminal 1 in a network (so that it may make or receive calls subsequently), the subscriber places their SIM card in a card reader associated with the mobile terminal 1. The terminal 1 then transmits its IMSI (read from the SIM card) to the base station.

The base station 3,20 receiving this communication would then transmit the IMSI to the MSC 2,32 with which the base station is registered. In a network using the functionality described in 3GPP TS 23.236, the base station follows prescribed rules to select which MSC to use, and then transmits this IMSI to the selected MSC.

In the following embodiment each base station 3,20 has a Media Access Control address (MAC address) identifying the base station. The MAC address is a generally unique code assigned to most forms of networking hardware. The address is generally permanently assigned to the hardware, so each base station has a unique MAC address. The access points 20 may be identified by some other form of unique access point identifier. Generally, such identifiers are referred to as access point identifiers (AP ID).

The MSC 2,32 then interrogates the core network 140, by transmitting the IMSI to the core network, together with information identifying the base station 3, 20 in order to determine whether or not the base station is a valid base station. When the core network 140 receives the interrogation signal from the MSC 2,32, it extracts the MAC address, which was concatenated with the IMSI information by the base station when that information was forwarded to MSC 2.

The core network then uses the MAC address to determine whether the base station is a legitimate base station. For instance, the MAC address can be used by the core network to determine whether the base station with the MAC address is a macro base station or an AP. Where the core network determines that the base station is a conventional macro base station 3, and not an AP, the network signals back to MSC 2 that communication is allowed through the base station. MSC 2 will then allow mobile terminal 1 to continue registering with base station 3. This is because conventional macro base station 3 is fully under the control of the core network, and hence not susceptible to hacking to the same degree as AP 20.

Therefore, where MSC 2 has been notified that base station 3 is a valid base station, MSC 2 will then interrogate the core network with a view to registering the mobile terminal with the base station. In this procedure, the core network will allow MSC 2 to access the appropriate location in the HLR 10 present in the network core 12 and extract the corresponding subscriber MSISDN and other subscriber data from the appropriate storage location, which is then stored temporarily in a visitor location register (VLR) of MSC 2. In this way, the particular subscriber may be registered with MSC 2, and the subscriber's information is temporarily stored in the VLR associated with that MSC.

In the situation where the mobile terminal 1 transmits its IMSI to the base station 20, being an AP, then the AP will forward the IMSI information to MSC 32 by concatenating it with its MAC address. MSC 32 will then interrogate the core network 12 with a view to determining the validity of AP 20. When the core network receives the interrogation signal from MSC 32, it is able to identify the base station 20 from the received MAC address as an AP. The network then compares the MAC address with a list of MAC addresses of APs through which communication is allowed. The network then signals back to MSC 32 as to whether communication is allowed or not through the AP.

It is to be appreciated that the identification of the base station can be conducted in the core network 140 and/or the MSC associated with the base station. Therefore, the current embodiment is to be taken as only one possible analysis arrangement able to achieve the described functionality.

The embodiments just described are effective in preventing spoofing of legitimate APs. However, those embodiments may still not necessarily prevent an owner of a legitimate AP from eavesdropping on data passing through the AP if they so chose.

A further embodiment of the present invention addresses this additional problem. According to this further embodiment of the present invention, instead of maintaining a database of all authentic APs, each subscriber is able to specify the APs through which that they will allow their device to communicate. In this way, subscribers can list one or more APs that they trust.

Therefore, according to this embodiment of the invention, when the MSC 32 interrogates the core network 12, the core network seeks to verify the AP, by accessing a list of allowed APs specific to the IMSI of the mobile device. The list details one or more MAC addresses of the allowed APs. The core network then notifies MSC 32 of the result of the comparison. Where a match is made, an appropriate signal is transmitted to notify MSC 32, which then proceeds with registering the subscriber with the AP in a known manner.

This list of allowed APs could be created by the subscriber entering the details of APs through which they will allow communication on, for example, an allocated website or by pairing with a base station and transmitting the data via the network.

The above described embodiment of the invention therefore provides subscribers with an enhanced degree of certainty as to the legitimacy of the Access Points they are utilising. However, in the event of AP 20 being spoofed by a rogue AP, the rogue AP may be able to adopt the MAC address of AP 20. In this regard, an experienced hacker can still figure out an authorized MAC address, masquerade as a legitimate address and gain access to the network and the information within it. However, the rogue AP would not have the same IP address, telephone number or be plugged into the same DSL port as the authentic AP and may not be in the correct location Therefore a rogue AP could be identified by either of these additional identifications. Such embodiments are now described.

Another embodiment of the invention makes use of the fact that the IP address of the AP transmitting the IMSI to MSC 32 is also incorporated in the IMSI communication signal. When the MSC 32 receives the initial IMSI signal from the mobile terminal, it interrogates the core network 12 and transmits the IMSI communication signal to the core network.

The core network 12 is then able to determine the MAC address of the base station forwarding the IMSI signal and identify the base station 20 as an AP. The core network would then also determine the IP address of the base station. The MAC address associated with the IP address is then checked against a database of authentic APs to verify the validity of AP 20. The database of authentic APs records the MAC addresses of all legitimate APs together with their respective IP addresses.

Therefore, when the IP address of an AP transmitting IMSI information to an MSC does not match that expected for the MAC address, then a bogus AP can be identified. When a bogus AP is identified, the core network will not allow the mobile terminal to register with that AP.

According to a still further embodiment of the invention, the authentication process may be repeated at regular intervals while the mobile terminal 1 remains activated, to prevent a bogus AP taking over a valid AP once the terminal has registered with a specific AP. In this regard, the mobile terminal may be configured to transmit regular check signals, or the MSC may be configured to regularly interrogate the mobile terminal in order to initiate the check.

According to an additional embodiment, it is possible that the AP is allocated a dymamic IP address. In this situation, upon checking the list of allowed APs, the core network 12 would recognise that the relevant MAC address was associated with a dynamic IP address. The core network would therefore then interrogate the dynamic IP address provider to determine what the current IP address assigned to the AP was, and compare that address with the one received from the MSC 32 in order to ascertain whether or not the AP was a legitimate AP.

Alternatively, the core network may regularly interrogate the dynamic IP address provider in order to ensure that the dynamic IP addresses in the list of allowed APs is continually kept updated. As a further alternative, the dynamic IP address provider may have the responsibility of notifying the core network when each dynamic IP address is allocated in order to maintain an up-to-date list of allowed APs.

These embodiments of the invention may be implemented on either an open or closed AP, although they are most useful with open APs. Where the AP is a closed access point, the AP may perform its own access control locally (i.e. at the AP), before transmitting the mobile subscriber's IMSI for the network to perform the verification of the AP. The access control may alternatively be performed at the core network 12.

The embodiments just described, have been in relation to the MSCs 2 and 32, which support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 2 and 32. The SGSNs 16, 18 are equipped with an equivalent to the VLR for the packet switched domain.

The embodiments just described have also been in relation to a mobile terminal initiating a communication. The present invention, however, is equally applicable to communications initiated by a calling party. In these circumstances, when a calling party attempts to call a mobile terminal within the network, that mobile terminal must be paged. Paging is a process of broadcasting a message which alerts a specific mobile terminal to take some action—in this example, to notify the terminal that there is an incoming call to be received. Once the terminal receives the broadcast message, it will seek to register with an appropriate base station, as per the embodiments already described.

Additionally, the system described herein is applicable to handover between different base stations, where a mobile terminal is moving during a call. From the description above, it will be understood that the coverage area of a mobile telecommunications network is divided into a plurality of cells, each of which is served by a respective base station. In order to allow a mobile terminal to maintain a call when the mobile terminal moves outside the coverage area of a cell, the call must be switched to an alternative cell automatically. In this instance, where one base station is to take over from an existing base station, a verification process will take place to ensure that the base station taking over is a valid base station.

In some of the embodiments described above the IP address has been used to help authorise the AP. Alternatively, the network may wish to make a more definite identification of the location of that AP. Embodiments which enable an identification of location can make use of DSL ID, CLI and network sniffing. Embodiments involving each of these techniques are now discussed.

Access points may be associated with the specific DSL connection into which the AP is plugged, which has a unique ID (DSL ID). The DSL ID is the port number of the switching exchange and can often be mapped to a specific home or business address. For example, a DSL port in a house will have a unique DSL ID. In embodiments of the invention, the core network 12 maintains a database of access point MAC addresses (or other AP IDs) and the associated DSL ID. The DSL ID may be obtained by the network when the AP is registered. For example, before registering the AP for use, the network might require confirmation of the DSL ID associated with the DSL line into which the AP will be plugged during use. In particular cases, it may be possible to register the access point for use at more than one DSL ID. For example, this would be convenient if a user wished to use his access point at more than one location.

In various embodiments of the invention, the MAC address (or other AP ID) and the DSL ID are transmitted to the network at particular times. For example, on setting up a communication through an AP, on request from the network and/or at activation of the AP. On receipt of the MAC address and the DSL ID, the network checks its database to confirm whether the AP is being used at a DSL ID at which it is registered. If the DSL ID matches that at which the AP is registered, the AP can be authorised, or determined that it is not a bogus AP. However, if the DSL ID received for an AP does not match that stored in the database, then the AP is not authorised, or determined that it is bogus.

When the AP is connected via a DSL cable, in certain situations, the DSL ID will not be made available to the network provider. Typically, if the network provider is acting as the ISP or if a company that has a relationship, for example a partnership, with the network provider provides the ISP, the network provider will be given access to the DSL ID associated with communications to and from the access point. However, if the network provider has no relationship with the ISP, the network provider will probably not be made aware of the location at which the access point is plugged into the ISP. Therefore, if a subscriber wishes to install an access point for use on their existing Internet Service Provider (ISP) the network may not gain any visibility of the DSL Ms into which its access points are plugged. In such a case, the traffic from the access point would be directed to the network by the ISP, along with the AP ID, but the DSL ID would not be forwarded to the network provider. In such systems the network provider could identify the access point (from the AP ID) and the MSISDN/IMSI of the calling party, but would not be aware of the physical location at which the access point is located since it is not informed of the DSL ID associated with the DSL port into which the access point is plugged. In this or other situations, the IP address may not be available to the network provider.

This would be problematic for networks that wish to detect the location of the access point, for example to provide a reduced tariff for subscribers based on the location of the access point or to meet proposed regulatory regulations requiring network providers to know the location of all APs in their network. It would further prevent authentication of the AP by verifying the APs identity.

Therefore, a further embodiment of the invention enables the network provider to determine the location of an access point when the subscriber is communicating through an ISP for which the network has no visibility of DSL IDs and is not made aware of the DSL IDs, and has no visibility of IP addresses. This embodiment will be described with reference to FIG. 4.

At the point of purchase or registration of an access point the network will identify whether the subscriber is intending to use the AP via an ISP for which the network will be advised of the DSL ID during use of the AP. If not, the subscriber will be required to provide the network with the calling line ID (CLI) associated with DSL line through which they wish to direct traffic from their access point. The CLI is, effectively, the telephone number associated with the DSL line and a unique CLI exists from every fixed line. The CLI is transmitted during all communications from that DSL. The CLI is then stored in the network database 350 as part of the subscriber profile along with the AP IP, MSISDN etc as shown in Step 1 of FIG. 4.

In use, the access point 300 is connected to a DSL modem 310 and subsequently connected to the ISP via a DSL filter/splitter 320. The access point 300 is also connected to the public switched telephone network via an analogue POTS connection and via the DSL filter splitter 320. In this regard, the AP 300 includes analogue telephone capabilities. The AP is configured so that on power up it dials a predefined telephone number through its analogue POTS connection at Step 2. The predefined telephone number may be an Interactive Voice Response (IVR) 330 associated with the network. As required by standard call set up procedure, the CLI associated with the line is transmitted to the destination called number. The IVR is therefore readily able to determine the CLI associated with the AP's incoming call.

On receipt of the incoming call, the IVR 330 also requests the AP ID of the calling access point. The AP may recognize the request and returns its AP ID automatically using DTMF tones. Alternatively, however, this process is fully automated through pre-configuration of the AP, whereby the AP ID may be transmitted automatically without requiring a prompt from the network. In still further alternative, the subscriber enters the contact number for the network and AP ID manually, for example via a keyboard associated with the AP. The IVR may also be used to just receive the CLI associated with the AP.

It is also to be appreciated that the IVR 330 is only an example arrangement for network to receive the AP ID and CLI, and that different arrangements may also be used.

On receipt of the CLI and AP ID, the IVR 330 forwards the CLI and AP ID onto the access controller 340 at Step 3. The access controller 340 compares the CLI and AP IDs with those values stored in the AP database 350 at step 4. If the CLI and AP ID match those stored in the database, the network can confirm that the AP is being used at the location for which the subscriber is registered. If the CLI does not match the registered CLI for that particular AP, the network can determine that the AP is not being used at the location at which it is registered.

In an alternative to this embodiment of the invention, the AP is registered for use at multiple locations. This is achieved by registering multiple CLIs against the subscriber profile in the database 350.

In still further alternative, the analogue call to the network is made periodically in order to allow the network to check that the AP remains at the same CLI at certain time intervals after power up. If the network identifies that the CLI no longer matches that identified in the subscriber's profile, it can transmit an instruction to the AP to shut down the 3G air interface. Such an instruction could be sent via the ISP or over the air.

Figure 4:
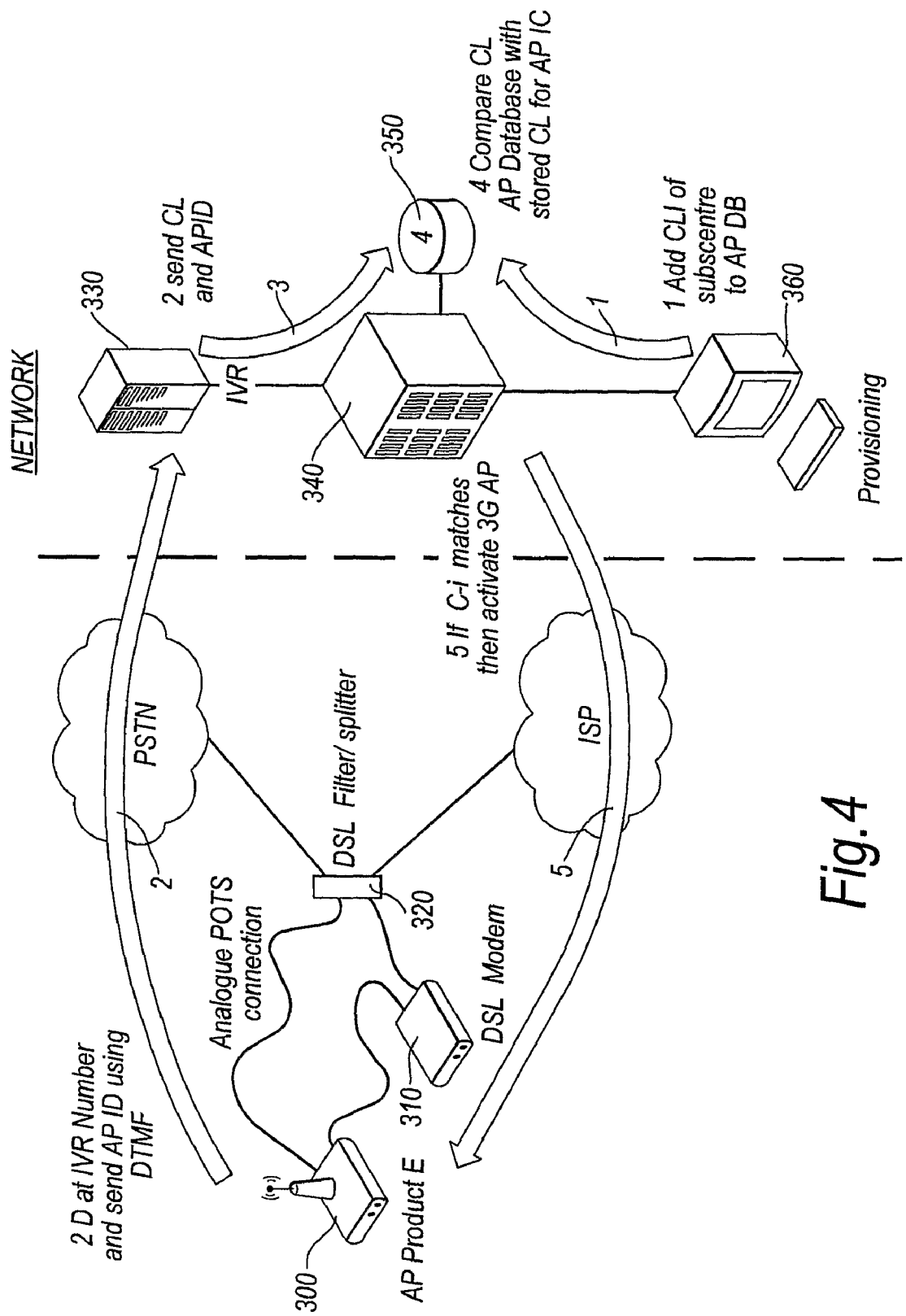
FIG. 4 illustrates a diagrammatic flowchart showing a procedure for verifying the location of an AP in a mobile telecommunications network according to a further embodiment of the system described herein.

Therefore, these embodiments of the invention described in relation to FIG. 4 enable the network provider to confirm the location of the AP in situations where it is not made aware of the DSL ID through which the AP is communicating and/or the IP address.

In still further embodiments, the network or AP could determine whether the AP is being used in an authorised location based on the local macro network radio conditions radio conditions generally. For example, when a user registers his AP he might have to identify the locations at which he wishes to use that AP, for example his home or business. The network could then determine the radio conditions from the macro network at those locations. This may be, for example, in terms of the cell IDs of the local base stations. These could then be stored at the network and/or on the AP. At specific times, for example at power up, on commencing a communication and/or on request from the network the AP might be prompted to inform the network of the local macro radio conditions. If the local conditions did not match those registered against that AP then the AP would not be authorised. For example, if the local cell IDs measured by the AP were not the same as those for which it was registered, the AP would not be authorised.

The manner in which the network chooses to use this information about the location of the AP may depend on the terms of the subscriber's contract. For example, the subscriber may only be permitted to use the AP from the CLI at which it is registered. The embodiment shown in FIG. 4 would be suitable for such use. If the CLI from which the AP is connected matches that on the subscriber's profile, the network transmits an activation signal to the AP via the ISP. The 3G air interface of the AP is only activated in response to a signal received by the network. If the CLI does not match that stored on the subscriber's profile, the AP is not activated. In this case, the network may transmit a signal that triggers the AP to alert the user that the 3G air interface of the AP is not permitted to be used.

The above examples show several ways in which the network might authorise the AP, or the AP might authorise itself. These include, checking IP address, DSL ID, CLI or macro radio conditions. The network may chose to use this location information in several ways, which may depend on the contract between the subscriber and the network or may be dictated by legal requirements on the network. For example, APs might not be permitted to be activated in locations other than those in which they are registered. In this case, if the AP is detected to be in a location other than that in which it is registered, the network might act to shut down the radio of the AP or deactivate the AP. If the AP is detected on initiation, the AP might not be activated at all. This might be handled by an over the air signal or an IP based signal direct to the AP. Alternatively, the network might simply refuse to direct calls through that AP. The location of the AP might also affect the tariff at which a subscriber is charged.

The core network 12 may be configured to charge for communication services provided to the mobile terminal 1 on a different basis when the mobile terminal 1 is connected to the core network 12 via an access point 20, rather than a conventional base station. Embodiments relating to mechanisms to facilitate different charging models are described in detail below.

The access point 20 may be configured to instruct the mobile terminal 1 to display an indication—such as a visual indication, when it is connected to the network core 12 via the access point 20. This may be particularly useful if communication services are charged for on a different basis when the mobile terminal 1 is connected to the network core 12 via the access point 20.

As mentioned above, an AP may be an "open" AP or a "closed" AP. An AP or the core network may be configured to determine whether a particular subscriber is entitled to a tariff reduction when using a given AP as an entry point to the mobile network. Subscribers that are entitled to a reduced tariff through an AP are typically referred to as "owners" and subscribers that are permitted to use the AP but are not entitled to the reduced tariff are referred to as "visitors". Subscribers who are neither 'owners' nor 'visitors' for a particular AP may not be entitled to use the AP. On identifying such a subscriber attempting to call through the AP, the network may not route the call through the AP but, instead, may terminate the call or route the call onto the macro network. The subscribers are identified by their MSISDNs. Alternatively, or additionally, the subscribers could be identified by IMSI. It should be understood that references to MSISDNs in the following embodiments could equally be exchanged for IMSI.

The MSISDNs of all owners are stored in a database in the network along with the MAC address/AP ID and IP address/DSL ID. These MSISDNs may be confirmed during registration or installation or may be added to the database at a later date. The owners and visitors are stored in different lists or fields to distinguish between the two.

If the AP is a closed AP, the database will also include MSISDNs of the visitors. An open AP is able to carry communications from any mobile device in the GSM/UMTS/LTE network, whereas a closed AP is only able to carry communications from specific pre-designated mobile devices. Typically an owner of an AP is able to designate whether their AP is open or closed.

Table 1 provides an example of data that would be stored in the database for a closed AP allowing two "owners" a reduced tariff when using the AP, and four "visitors" access to the mobile network via the AP, but on their normal tariff.

TABLE 1

| AP ID | Owner MSISDN | Visitor MSISDN (closed AP only) | DSL-ID |
|---|---|---|---|
| AP-123 | 07766xxxxx1 07766xxxxx2 | 07766xxxxx3 07766xxxxx4 07766xxxxx5 07766xxxxx6 | VF-123 |

Considering the Table 1 example, when a subscriber makes a call through the AP, an access controller will receive the subscriber's MSISDN together with the applicable MAC address/AP-ID and/or IP address/DSL-ID. To verify whether the subscriber is authorised to a reduced tariff, the access controller checks the received data against the data recorded in database. For example, if the subscriber's MSISDN is listed as an "owner" in relation to the received AP ID and/or DSL ID, then the subscriber will be entitled to a reduced tariff for that call. More specifically, with reference to Table 1, where the received AP ID is AP-123, the received DSL-ID is VF-123 and the subscriber's MSISDN is 07766xxxxx1 or 07766xxxxx2, the access controller will verify the subscriber as an owner entitled to a reduced tariff.

On the other hand, where the subscriber's MSISDN is one of 07766xxxxx3-6 that subscriber will be verified by the access controller as a visitor, and therefore permitted to communicate through AP-123 when connected to DSL-ID VF-123, but not entitled to a reduced tariff. Additionally, as this example is in relation to a closed AP, any further subscribers, for example 07766xxxxx7, will not permitted to use the AP at all.

Both the received AP ID and DSL ID values may match those in the database in order to benefit from the reduced tariff. This is because, if the AP ID and MSISDN match those in the database, but the DSL ID does not match, this will imply that the subscriber is using the AP from a different location to that for which the AP is registered. Therefore it is preferable that the subscriber is not entitled to a reduced tariff for that call. However, it is to be appreciated that the network may allow a subscriber to register multiple IP addresses/telephone numbers/DSL IDs for a given AP. This would allow the owner of an AP some flexibility in using the AP in a plurality of different registered locations. In a variation of this embodiment, rather than the subscribers obtaining a reduced tariff, an alternative benefit is provided to the subscriber. For instance other benefits that may be implemented include a benefit in a loyalty scheme or free air-time on the macro network.

In a variation of this embodiment, rather than the subscribers obtaining a reduced tariff, an alternative benefit is provided to the subscriber. For instance other benefits that may be implemented include a benefit in a loyalty scheme or free air-time on the macro network.

In a still further variation of this embodiment, the owner and visitor fields may be implemented to provide subscribers in each particular field different tariff reductions or different benefits. For instance, the subscribers listed in the visitor field, may also receive a tariff reduction when using the AP to access the mobile telecommunications network, but the reduced tariff will be a different tariff reduction to that provided to subscribers listed as "owners". Alternatively, or in addition, the owner may receive a benefit when a visitor makes use of the AP.

It will be clear to those skilled in the art that DSL ID is just one example of how the location of the AP can be checked when the network is determining on what tariff to charge the subscriber. IP address, macro network radio conditions and CLI can all provide information helping to identify the location of the AP, which can then be used to determine whether the AP is in a location in which the subscriber is entitled to a reduced tariff or some other benefit. For example, if the AP is connected through its registered CLI, the network may charge the subscriber at his reduced rate. However, if the CLI does not match that registered to the AP, the network may allow the AP to be activated but will charge the subscriber at a higher tariff.

Once the location of the AP is known, the network is able to monitor whether subscribers calling through the AP are entitled to be charged at a reduced tariff, or whether they are permitted to use the AP at all. The MSISDNs/IMSIs calling through the AP can then be checked against the network database and the network can determine whether the caller should be charged at a reduced rate. Alternatively, or additionally, if the AP is determined to be at a location at which it is not registered, for example if the DSL ID, IP address or CLI do not match those associated with the AP, the network may not permit traffic through the AP. In preferred embodiments, the network may deactivate the AP.

In a further alternative embodiment, the database of authentic APs records the AP IDs addresses of all legitimate APs together with their respective DSL ID s/IP addresses/telephone numbers/CLIs/macro network radio condictions, where they are known. The core network is then able to check any of these additional identifications to verify if the AP is a legitimate AP.

The embodiments of the invention just described are not to be considered as explicit embodiments, as changes and additions are possible.

For instance, in the embodiments described above, the AP is configured to appear to the mobile terminal as a conventional base station that communicates with the UE using GSM/UMTS/LTE protocols in accordance with the Standards (where they exist) and the licensed radio spectrum. Alternatively, the AP could communicate with the UE by any other suitable technology—for example, by a Bluetooth® connection, WiFi or another unlicensed mobile access (UMA) protocol, which allows the GSM/UMTS/LTE features to be provided using a non-GSM/UMTS/LTE bearer technology.

In the embodiments described above, the network is able to determine whether an access point is a legitimate access point or if it bogus. One embodiment makes this determination based on the MAC address, or other AP ID, which is transmitted to the network on commencing a communication. Further embodiments enable subscribers to specify which APs they will allow their communications to be directed through by creating a record of allowed MAC addresses (or AP IDs) against their IMSI (or MSISDN). This facility gives a user the assurance that his communications will not be routed through an access point which he does not trust.

The IP address, DSL ID, CLI and/or macro network radio condictions can be used in conjunction with the AP MAC address or other AP ID to authenticate the AP by checking that received values for a particular AP match the expected values stored in a database. This authentication also confirms the location of the AP (that is, the AP is using a particular fixed telephone line or DSL connection). This facilitates differential charging—e.g. to provide discounted services when a user accesses the network using an AP at their home address. This also allows the core network to prevent an AP from being used at an unauthorised location—e.g. where it may disrupt the macro network.

It will be clear to those skilled in the art that embodiments of the present invention provides multiple ways in which information regarding usage of APs can be obtained monitored by a network. Embodiments of the invention enable a network, or the AP itself, to determine the IMSI or MSISDN calling through the AP, the AP ID and the location of the AP. The network can use this information in a manner of ways including: increasing the security of the APs, for example by detecting whether an AP is a bogus AP; for allowing users to restrict who is permitted to communicate through their AP (closed APs); for detecting whether a subscriber is entitled to a reduced tariff when communicating through and AP; and, meeting regulatory requirements and controlling the impact of APs on the macro network by detecting and controlling the locations in which an AP might be active.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method of determining the validity of an IP-transport connected base station for a mobile device to communicate through, the method comprising:
   receiving an initiation signal from the mobile device via the base station;
   identifying the base station forwarding the initiation signal, wherein identifying the base station includes identifying the base station by determining a base station identifier allocated to the base station;
   determining whether the identified base station is a valid base station; and
   transmitting an appropriate response signal to the mobile device, and the method further comprising at least one of the following:
   (i) comparing the base station identifier of the base station against a list of base station identifiers of predesignated valid base stations, and determining that the base station is a valid base station if there is a match,
   (ii) comparing the base station identifier and a routing identifier of the base station against a list of base station identifiers and routing identifiers of predesignated valid base stations, and determining that the base station is a valid base station if both match, and
   (iii) comparing the base station identifier and a telephone number of the base station against a list of base station identifiers and telephone numbers of predesignated valid base stations, and determining that the base station is a valid base station if both match.

2. The method of claim 1, further comprising:
   deactivating the base station if the base station is not a valid base station.

3. The method of claim 1, wherein the identification step further comprises identifying the base station by determining the routing identifier of the base station.

4. The method of claim 1, wherein the routing identifier comprises at least one of: an IP address of the base station, and a DSL ID of the base station.

5. The method of claim 1, wherein at least one of the following is further provided: the base station identifier comprises a MAC address, and the telephone number is determined by Calling Line Identification (CLI).

6. The method of claim 1, wherein the determination step further comprises identifying the base station by determining the telephone number of the base station.

7. The method of claim 1, wherein the base station is connected to a telecommunications network via a first connection and also has a second connection to an analogue network, the method further comprising causing the base station to dial a predetermined telephone number through the analogue connection.

8. The method of claim 7, further comprising:
   transmitting a communication from the base station through the analogue connection, which provides the base station identifier using DTMF (dual tone multi-frequency) tones.

9. The method of claim 7, wherein the predetermined telephone number relates to a first processing device and a second base station identifier is provided in response to a request from the first processing device.

10. The method of claim 9, wherein the first processing device is configured before forwarding the telephone number and base station identifier to a second processing device to compare the identifiers with the predetermined data.

11. The method of claim 1, wherein a user of the mobile terminal predesignates the list of base stations which the mobile terminal is allowed to access.

12. The method of claim 1, wherein the validity determination is at least one of: repeated at regular intervals while the mobile terminal remains activated, occurs when a mobile terminal seeks to register with the base station, and occurs when a mobile terminal is handed over from one base station to another.

13. The method of claim 1, further comprising at least one of:
   determining whether a user is entitled to communicate through the base station, and
   determining whether or not the user is entitled to a benefit when communicating through the base station.

14. The method of claim 13, wherein the benefit corresponds to whether or not the user is entitled to a tariff reduction when communicating through the base station.

15. A method of determining the validity of an IP-transport connected base station for a mobile device to communicate through, the method comprising:
receiving an initiation signal from the mobile device via the base station;
identifying the base station forwarding the initiation signal, wherein identifying the base station includes identifying the base station by determining a base station identifier allocated to the base station;
determining whether the identified base station is a valid base station, wherein the determining includes determining that the base station identifier of the base station corresponds with a variable routing identifier, and interrogating a variable routing identifier provider to determine a current routing identifier corresponding to the base station identifier of the base station; and
transmitting an appropriate response signal to the mobile device.

16. A method of determining the validity of an IP-transport connected base station, the method comprising:
receiving an identification signal from the base station, the signal including a base station identifier that identifies the base station;
receiving additional information relating to the base station, wherein the additional information includes at least one of: a routing identifier of the base station, a telephone number associated with the base station, and network radio conditions associated with the base station; and
determining whether the identified base station is a valid base station in dependence on the identification of the base station and the additional information, and
the method further comprising at least one of the following:
(i) comparing the base station identifier and the routing identifier of the base station against a list of base station identifiers and routing identifiers of predesignated valid base stations, and determining that the base station is a valid base station if both match,
(ii) comparing the base station identifier and the telephone number of the base station against a list of base station identifiers and telephone numbers of predesignated valid base stations, and determining that the base station is a valid base station if both match, and
(iii) comparing the base station identifier and the network radio conditions associated with the base station against a list of base station identifiers and network radio conditions of predesignated valid base stations, and determining that the base station is a valid base station if both match.

17. The method according to claim 16, wherein the routing identifier comprises at least one of: a DSL ID of the base station, and an IP address of the base station of the base station.

18. The method of claim 16, wherein at least one of the following is further provided: the base station identifier comprises a MAC address, and the telephone number is determined by Calling Line Identification (CLI).

19. The method of claim 16, wherein the base station is connected to a telecommunications network via a first connection and also has a second connection to an analogue network, the method further comprising causing the base station to dial a predetermined telephone number through the analogue connection.

20. The method of claim 19, further comprising:
transmitting a communication from the base station through the analogue connection, which provides the base station identifier using DTMF (dual tone multi-frequency) tones.

21. The method of claim 19, wherein the predetermined telephone number relates to a first processing device and the second base station identifier is provided in response to a request from the first processing device.

22. The method of claim 21, wherein the first processing device is configured before forwarding the telephone number and base station identifier to a second processing device to compare the identifiers with the predetermined data.

23. The method according to claim 16, further comprising at least one of:
restricting communications through the base station in dependence on the base station being an invalid base station,
deactivating the base station in dependence on the base station being an invalid base station,
not activating the base station in dependence on the base station being an invalid base station,
deactivating a radio on the base station in dependence on the base station being an invalid base station, and
not activating a radio on the base station in dependence on the base station being an invalid base station.

* * * * *